(12) United States Patent
Berhan

(10) Patent No.: US 7,699,737 B2
(45) Date of Patent: Apr. 20, 2010

(54) ELECTRIC AXLE DRIVE UNIT

(75) Inventor: Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 12/026,227

(22) Filed: Feb. 5, 2008

(65) Prior Publication Data

US 2009/0197730 A1    Aug. 6, 2009

(51) Int. Cl.
  *F16H 3/72*    (2006.01)
  *H02K 41/02*   (2006.01)
  *H02K 49/00*   (2006.01)

(52) U.S. Cl. ................. 475/5; 310/12.14; 310/94
(58) Field of Classification Search .......... 475/5, 475/150; 477/8, 12; 180/65.6
See application file for complete search history.

(56) References Cited

U.S. PATENT DOCUMENTS

| | | | | |
|---|---|---|---|---|
| 1,423,090 | A * | 7/1922 | Delano | 318/274 |
| 2,152,005 | A * | 3/1939 | Walter | 290/38 A |
| 2,195,219 | A * | 3/1940 | McGoldrick | 477/12 |
| 2,195,652 | A * | 4/1940 | McGoldrick | 310/78 |
| 4,598,804 | A * | 7/1986 | Sommer | 477/12 |
| 4,838,234 | A * | 6/1989 | Mayer | 123/559.2 |
| 5,346,031 | A * | 9/1994 | Gardner | 180/179 |
| 6,008,606 | A * | 12/1999 | Arai et al. | 318/431 |
| 6,380,640 | B1 | 4/2002 | Kanamori et al. | |
| 6,569,054 | B2 | 5/2003 | Kato | |
| 6,640,917 | B2 | 11/2003 | Maruyama | |
| 6,656,082 | B1 | 12/2003 | Yamada et al. | |
| 6,793,034 | B2 | 9/2004 | Raftari et al. | |
| 6,932,738 | B2 | 8/2005 | Aoki et al. | |
| 7,095,196 | B2 | 8/2006 | Tokunou et al. | |
| 7,559,390 | B2 * | 7/2009 | Marsh et al. | 180/65.6 |
| 7,588,508 | B2 * | 9/2009 | Marsh et al. | 475/5 |

* cited by examiner

*Primary Examiner*—Dirk Wright
(74) *Attorney, Agent, or Firm*—David B. Kelley; MacMillan, Sobanski & Todd, LLC

(57) ABSTRACT

A drive unit for transmitting power to wheels of a motor vehicle includes an input driveably connectable to a first power source, a final drive gear set driveably connectable to the wheels, a motor/generator including a stator and a rotor arranged about an axis, the rotor being able to rotate about the axis and to move along the axis relative to the stator, a gear unit arranged about the axis and driveably connected to the gear set for driving the gear set at a speed that is less than a speed of the rotor, and a coupler secured to the rotor for alternately coupling the rotor and the gear unit mutually and transmitting power therebetween and decoupling the rotor and the gear unit mutually.

12 Claims, 3 Drawing Sheets

ELECTRIC AXLE DRIVE UNIT

BACKGROUND OF THE INVENTION

1. Field of the Invention

This invention relates generally to a powertrain for a motor vehicle, and, more particularly, to a powertrain having multiple power sources including an electric motor for driving a set of vehicle wheels.

2. Description of the Prior Art

In a powertrain for a hybrid electric vehicle (HEV), inertial masses and drag losses offset the fuel economy, performance, and dynamic response gains of the hybrid system. These offsets are greater when the hybrid drive components are not substituted for standard powertrain components.

Electric rear axle drive units for front wheel drive vehicles add additional components and thus inertias and drag losses in both electric all wheel drive and shaft-driven mechanical all wheel drive systems. Electric front axle or rear axle drives for rear wheel drive vehicles added on top of the existing longitudinal driveline present the same problems.

The inertial masses include the added motor/generator rotor, gear assemblies, and shaft and hub assemblies. The drag losses include the additional gear and bearing losses of the drive components and electromagnetic drag losses in motor assemblies. The various drag losses can be reduced by design detail, but cannot be eliminated.

These inertias and drag torques are further multiplied by the gear ratios often present between the motor/generator and their mechanical outputs to the drivetrain.

It would be desirable to reduce the effects of inertial masses and drag torques, especially when the electric drive is not in operation. A need exists for a technique to connect and disconnect an electric motor for a front axle drive or rear axle drive motor from the driveline or the respective axle so that inertia and drag losses can be reduced. Controlled hydraulically-actuated friction clutches for this purpose increase the complexity of a hydraulic system and fluidic drag losses.

SUMMARY OF THE INVENTION

A drive unit for transmitting power to the wheels of a motor vehicle includes an input driveably connectable to a first power source, a final drive gear set driveably connectable to the wheels, a motor/generator including a stator and a rotor arranged about an axis, the rotor being able to rotate about the axis and to move along the axis relative to the stator, a gear unit arranged about the axis and driveably connected to the gear set for driving the gear set at a speed that is less than a speed of the rotor, and a coupler secured to the rotor for alternately coupling the rotor and the gear unit mutually and transmitting power therebetween and decoupling the rotor and the gear unit mutually.

The drive unit improves fuel efficiency, performance, and dynamics of a HEV with an electric front axle drive unit or a rear axle drive unit by connecting and disconnecting an electric motor from the driveline or the respective axle thereby reducing inertia and drag losses.

The drive coupling and decoupling can be used in a powertrain that includes a modular hybrid transmission (MHT) and an integrated starter generator (ISG). In a MHT system, the ISG motor is coupled or decoupled to the engine and transmission depending on the relative magnitudes of motoring, electric power generating and engine starting or braking desired.

The motor provides both axial displacement and rotation in one unit. Rotation and displacement can be controlled separately, providing two fully independent degrees of freedom.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
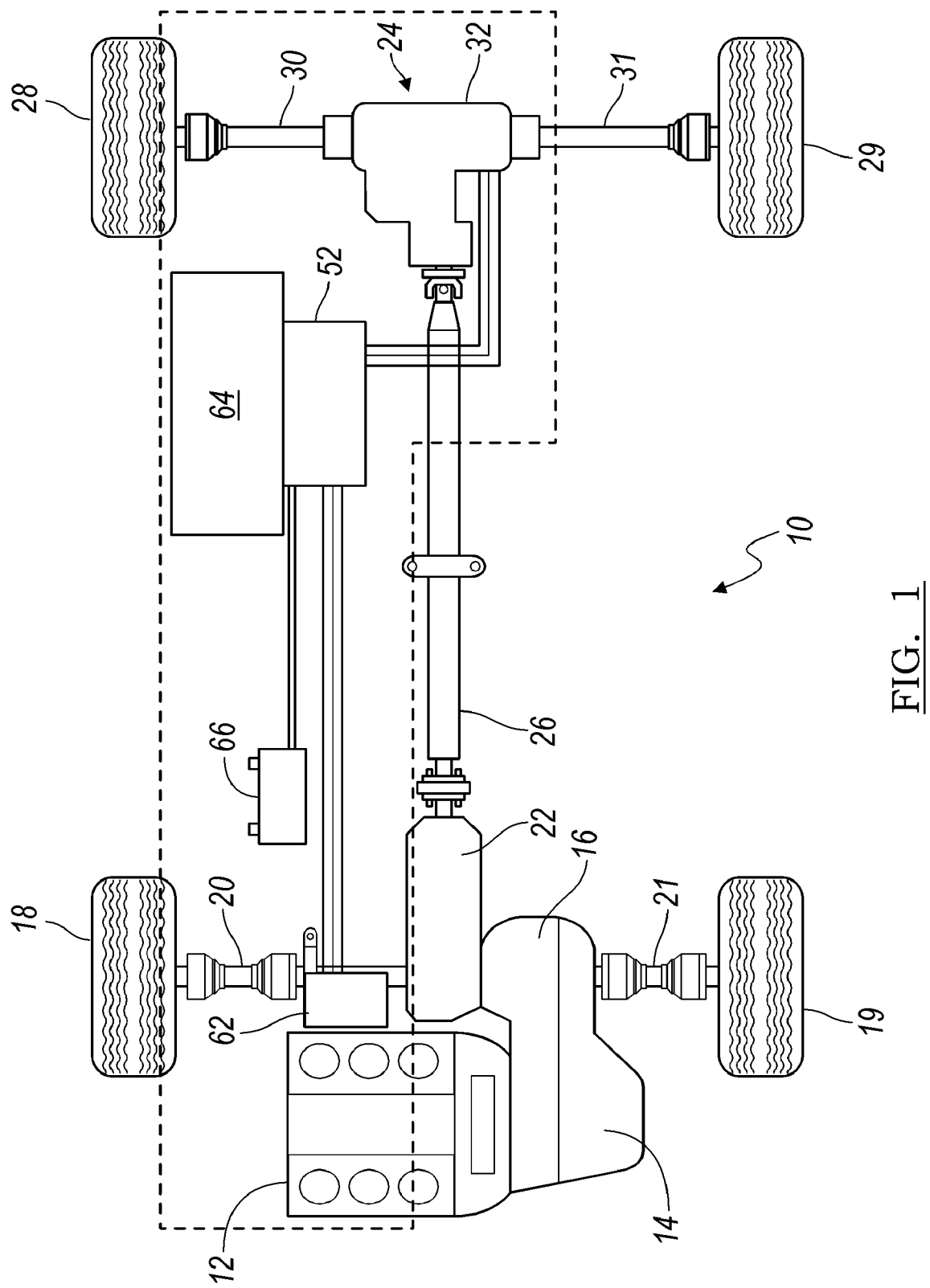
FIG. 1 is a schematic diagram of a powertrain for a hybrid electric vehicle, whose rear axle shafts are driven by an electric rear axle drive (ERAD) unit.

The powertrain 10 for a hybrid electric motor vehicle illustrated in FIG. 1 includes an IC engine 12, a transmission 14, which drives a front final drive unit 16 connected to a pair of front wheels 18, 19 by front drive shafts 20, 21. Transmission 14 may be a manual gearbox or any type of automatic transmission. The front final drive unit 16 also drives a rear drive take-off unit 22, which is connected to an electric rear drive unit 24 by a longitudinal prop shaft 26. Drive unit 24 is driveably connected to a pair of rear wheels 28, 29 by rear drive shafts 30, 31. Drive unit 24 includes a casing 32, which is prevented from rotating by being secured to the vehicle chassis, contains the inboard ends of the rear drive shafts 30, 31.

Figure 2:
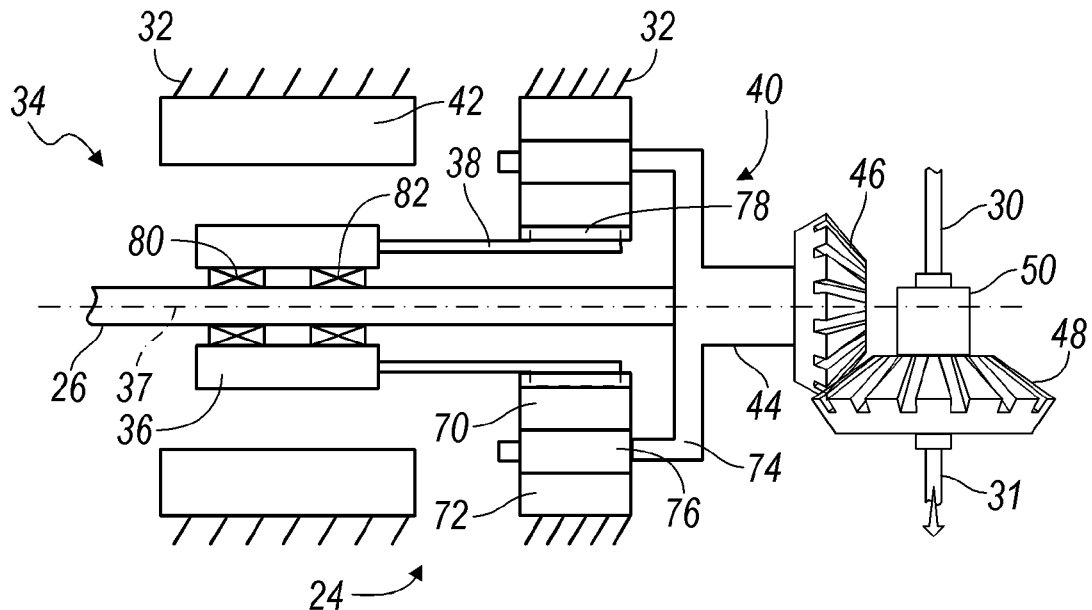
FIG. 2 is a schematic diagram of a drive unit that includes a motor having two degrees of freedom.

FIG. 2 shows an electric machine, such as a motor/generator 34, arranged longitudinally in a drive unit 16, 24 and having two degrees of freedom including rotation of rotor 36 about axis 37 and displacement of the rotor along the axis.

The rotor 36 of electric machine 34 is a hollow rotor, which is connected by a sleeve shaft 38 to a speed reduction planetary gear unit 40. The stator 42 of electric machine 34 is secured to casing 32. The drive unit input, prop shaft 26, is driveably connected to a shaft 44, which is secured to a final drive gear set that includes bevel pinion 46. A bevel gear 48 meshing with bevel pinion 46 is secured to a ring gear of a differential mechanism 50, which drives the axle shafts 30, 31 and wheels 28, 29.

Differential 50 may be of the type comprising a ring gear that rotates about the laterally directed axis of drive shafts 30, 31, a spindle driven by the ring gear and revolving about the lateral axis, bevel pinions secured to the spindle for revolution about the lateral axis and rotation about the axis of the spindle, and side bevel gears meshing with the bevel pinions, each side bevel gear being secured to one of the drive shafts 30, 31.

Under low vehicle speed driving conditions, the electric motor/generator 34 is used to drive the vehicle with the engine 12 stopped, in which case the rear wheels 28, 29 are driven through the speed reduction planetary gear unit 40 and the differential mechanism 50. Under heavier load at low vehicle speed, the motor/generator 34 can be used to supplement power produced by the engine 12. At higher vehicle speed, engine 12 is the primary power source for driving wheels 28, 29 through prop shaft 26, shaft 44, bevel pinion 46, bevel gear 48, and differential mechanism 50.

The motor/generator 34 is controlled by an electronic control unit (ECU) 52. Electric power and rotating power are generated by the motor/generator 34 and by a starter/generator 54, which alternately drives and is driven by the engine 12. Both the motor/generator 34 and the starter/generator 54 alternately draw electric current from and supply electric current to a traction battery 64 and an auxiliary battery 66. The traction battery 64 is a high voltage unit. The auxiliary battery 66 is a 12V unit for the supply and control of the vehicle electrical systems.

The engine 12 drives the front wheels 18, 19 through transmission 14, the front final drive unit 16 and the front drive shafts 20, 21, while also driving the rear wheels 28, 29 through the rear take-off unit 22, prop shaft 26, drive unit 24 and the rear drive shafts 30, 31.

The speed reduction planetary gear unit 40 includes a sun gear 70, ring gear 72, a carrier 74 secured to shaft 44, and a set of planet pinions 76, supported for rotation on carrier 74 and meshing with ring gear 72 and sun gear 70. Ring gear 72 is grounded on casing 32. Sun gear is connected by a spline 78 to shaft 38, which is secured to rotor 36. The angular velocity of rotor 36, shaft 38 and sun gear 70 is preferably about three times greater than that of carrier 98, shaft 44 and bevel pinion 46, although a greater speed reduction can be provided by gear unit 40 between rotor and pinion 46.

Figure 3:
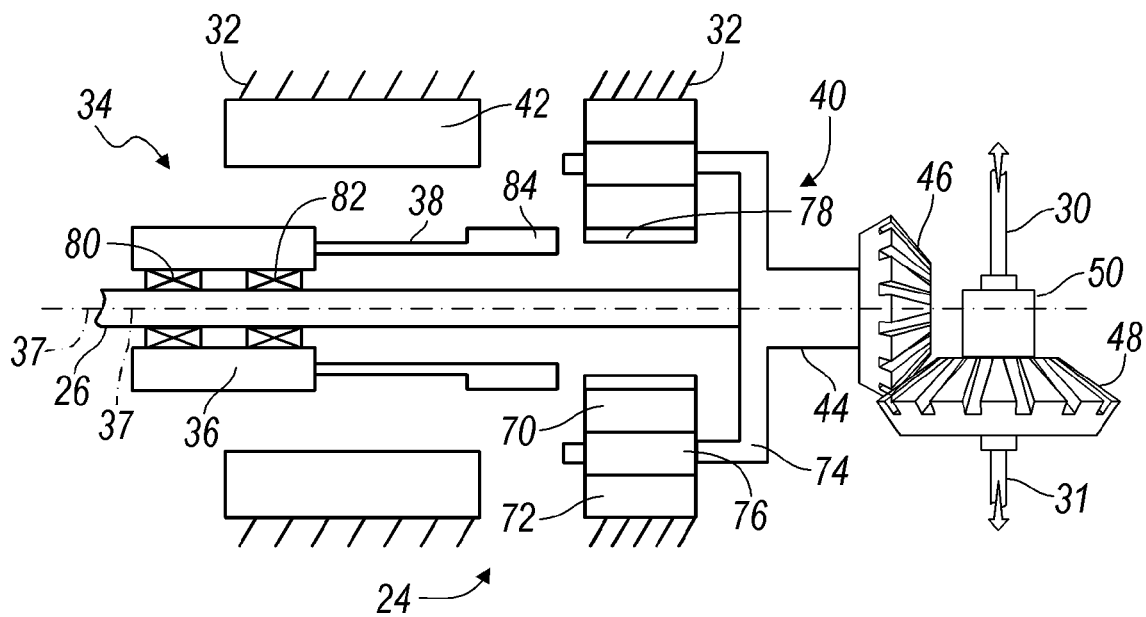
FIG. 3 is a schematic diagram of the drive unit of FIG. 2, in which the motor is decoupled from the output.

FIG. 3 shows rotor 36 displaced leftward from the position of FIG. 2 along the axis of prop shaft 26 while supported by bearings 80, 82, located between the prop shaft and rotor. The spline 84 on the end of shaft 38 is formed with axially-directed teeth that disengage the axially-directed teeth of the spline 78 that is formed on sun gear.

In operation, when rotor 36 is in the position shown in FIG. 2, engine 12 and rotor 36 are driveably connected to sun gear 70. When electric power is provided to motor/generator 34 and engine 12 is operating, they transmit power to axle shafts 30, 31 through differential 50. Carrier 74 drives shaft 44 at a reduced speed compared to that of rotor 36 and sun gear 70, and the bevel pair 46, 48 produces an additional speed reduction at the input of differential 50.

When rotor 36 is in the position shown in FIG. 3, motor/generator 34 is driveably disconnected from axle shafts 30, 31, which are driven by engine 12 through bevel pinion 46, bevel gear 48 and differential 50. The rotor 36 of motor/generator 34, therefore, has two degree of freedom: rotation about the axis of prop shaft 26 and axial displacement along the prop shaft. Such motors are often referred to as "helical" or "X-theta" (X-θ) motors. Alternatively, a standard rotary motor/generator can be used as a replacement for motor/generator 34 to drive the axle shafts 30, 31 and for regenerative braking, and a separate linear mechanism, such as an actuated shift rail, alternately connects its rotor to shaft 44 and disconnects its rotor from shaft 44.

Figure 4:
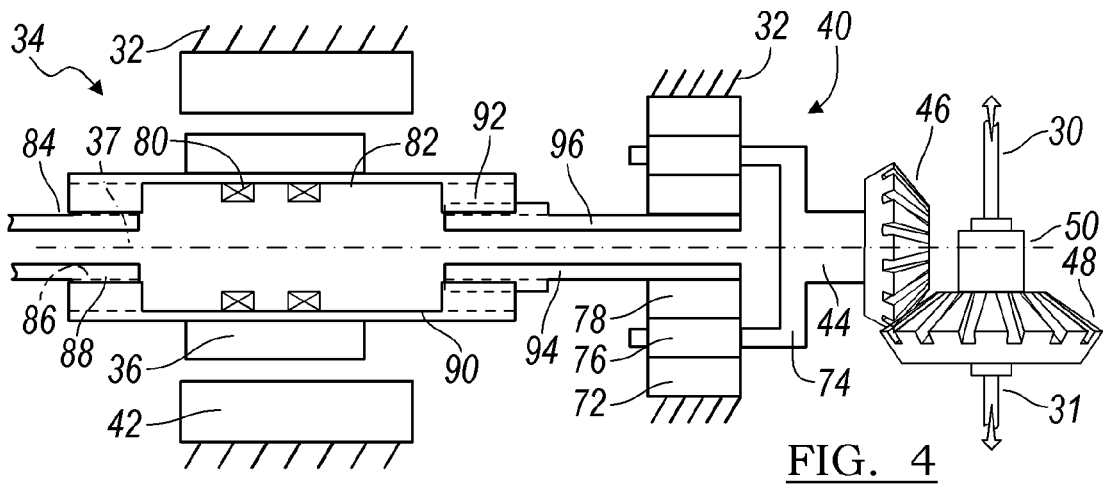
FIG. 4 is a schematic diagram of a second embodiment of a drive unit that includes a motor having two degrees of freedom.

FIG. 4 illustrates a motor/generator 34, whose rotor 36 rotates about axis 37 and moves along the axis. A prop shaft 84, functionally similar to prop shaft 26, is formed with a spline 86 having axial teeth, which alternately engage and disengage the axial spline teeth 88 formed on rotor shaft 90. The opposite end of rotor shaft 90 is a spline 92 having axial teeth, which continually engage the long axial spline teeth 94 formed on shaft 96, which is secured to sun gear 78.

Figure 5:
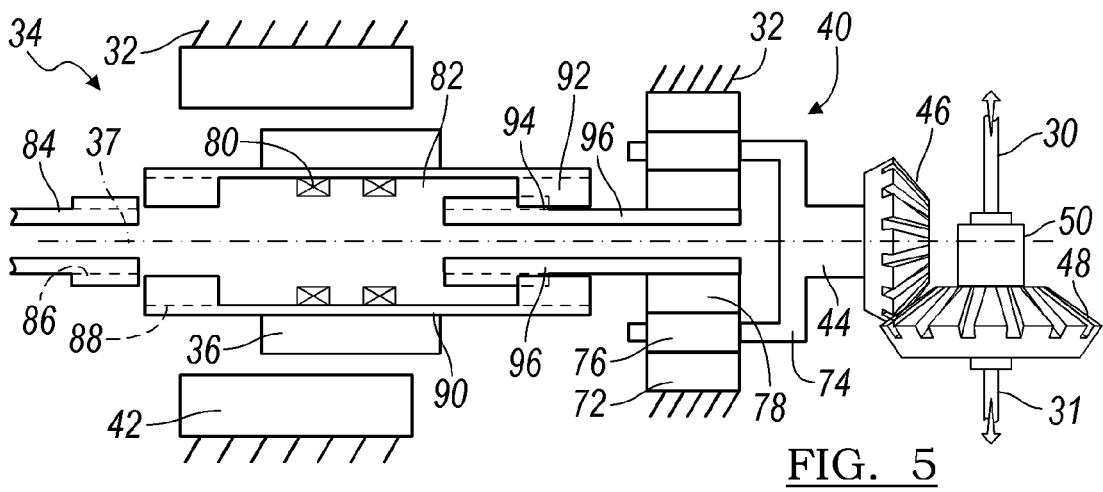
FIG. 5 is a schematic diagram of the drive unit of FIG. 4, in which the motor is decoupled from the prop shaft and engine input.

FIG. 5 illustrates the rotor 36 and rotor shaft 90 displaced axially rearward such that rotor shaft 90 is disconnected from prop shaft 84 and remains connected to sun gear 78.

In operation, when rotor 36 is in the position shown in FIG. 4, rotor 36 and prop shaft 84 are driveably connected to sun gear 70. When electric power is provided to motor/generator 34, it transmits power to gear unit 40. When engine 12 is operating, the engine transmits power to gear unit 40. Carrier 74 drives shaft 44 at a reduced speed compared to that of rotor 36, and the bevel pair 46, 48 produces an additional speed reduction at the input of differential 50. Axle shafts 30, 31 are driven through differential 50.

When rotor 36 is in the position shown in FIG. 5, the engine 12 and prop shaft 84 are disconnected from gear unit 40 and the axle shafts 30, 31. When electric power is provided to motor/generator 34, rotor 36 drives gear unit 40, which transmits power to axle shafts 30, 31 through differential 50.

Figure 6:
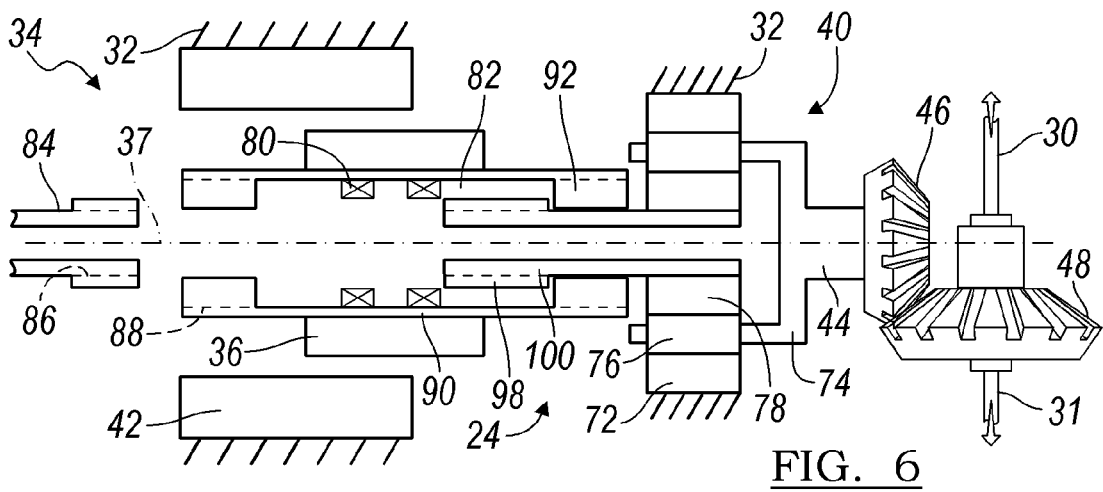
FIG. 6 is a schematic diagram of a third embodiment of a drive unit, in which the motor is decoupled from both the output and the prop shaft and engine input.

FIG. 6 illustrates a motor/generator 34, whose rotor 36 rotates about axis 37 and moves along the axis. The prop shaft 84 is formed with a spline 86 having axial teeth, which alternately engage and disengage the axial spline teeth 88 formed on rotor shaft 90. The opposite end of rotor shaft 90 is formed with a spline having axial teeth 92, which alternately engage and disengage the long axial spline teeth 98 formed on shaft 100, which is secured to sun gear 78.

In operation, when the power unit of FIG. 6 is in the position shown in FIG. 4, rotor 36 and prop shaft 84 are driveably connected to sun gear 70. When electric power is provided to motor/generator 34, it transmits power to gear unit 40. When engine 12 is operating, the engine transmits power to gear unit 40. Carrier 74 drives shaft 44 at a reduced speed compared to that of rotor 36, and the bevel pair 46, 48 produces an additional speed reduction at the input of differential 50. Axle shafts 30, 31 are driven through differential 50.

When the power unit is in the position shown in FIG. 6, both the engine 12 and rotor 36 are disconnected from gear unit 40 and the axle shafts 30, 31.

Although FIG. 1 illustrates a drive unit 24 and axle shafts 30, 31 located at the rear of the vehicle, the drive unit illustrated in FIGS. 2-6 may also be used to drive the front shafts 20, 21, in which case the drive unit is located in the front final drive unit 16.

The drive units of FIGS. 1-6 can be driven by a permanent magnet motor, induction motor, switched reluctance motor, variable reluctance motor, Halbach array, stepper, Sawyer, or other motor types. The drive unit may include one or more of the following: one moving translational rotor shaft assembly with both a one degree-of-freedom rotary stator and a one degree-of-freedom linear stator core; multiple standard rotary stator cores used to add a thrust on one rotor shaft; multiple standard linear stator cores used to add rotation on one rotor shaft; and a standard inside stator and outside stator with one moving rotor shaft assembly. Using Halbach array motors for inside and outside system designs can add higher strength and efficiency and easier field decoupling.

A suitable multiple degree-of-freedom motor system could include dual, helically wound, in-line cores with helical flux that can be controlled by variable frequency for independent thrust and rotation. HEV use would tend towards angles set primarily in the rotational direction, with field harmonics, such as in the lower frequencies, controlling axial thrust and position.

In accordance with the provisions of the patent statutes, the preferred embodiment has been described. However, it should be noted that the alternate embodiments can be practiced otherwise than as specifically illustrated and described.

The invention claimed is:

1. A drive unit for transmitting power to wheels of a motor vehicle comprising:
   an input driveably connectable to a first power source;
   a final drive gear set driveably connectable to the wheels;
   a motor/generator including a stator and a rotor arranged about an axis, the rotor being able to rotate about the axis and to move along the axis relative to the stator;
   a gear unit arranged about the axis and driveably connected to the gear set, for driving the gear set at a speed that is less than a speed of the rotor; and
   a coupler secured to the rotor for alternately coupling the rotor and the gear unit mutually and transmitting power therebetween, and decoupling the rotor and the gear unit mutually.

2. The drive unit of claim 1 wherein the input is continually driveably connected to the gear set.

3. The drive unit of claim 1 wherein the gear unit includes:
   a sun gear driveably connected to the rotor;
   a ring gear held against rotation;
   a carrier driveably connected to the gear set; and
   planet pinion supported for rotation on the carrier and engaged with the sun gear and the ring gear.

4. The drive unit of claim 1 wherein the gear set includes:
   a bevel pinion aligned with the axis; and
   a bevel gear engaged with the bevel pinion and sized such that a speed of the bevel pinion is greater than a speed of the bevel gear.

5. The drive unit of claim 4 further comprising:
   first and second axle shafts, each axle shaft connected to one of the wheels; and
   a differential mechanism driveably connected to the bevel gear for transmitting power between the bevel gear and the axle shafts.

6. The drive unit of claim 1 wherein the coupler alternately couples the rotor and the input mutually and transmits power therebetween, and decouples the rotor and the input mutually.

7. A drive unit for transmitting power to wheels of a motor vehicle comprising:
   an input driveably connectable to a first power source and formed with a first spline that includes teeth directed along an axis;
   a final drive gear set driveably connectable to the wheels;
   a motor/generator including a stator and a rotor arranged about the axis, the rotor being able to rotate about the axis and to move along the axis relative to the stator;
   a gear unit arranged about the axis, driveably connected to the gear set and formed with a second spline that includes teeth directed along the axis, the gear unit driving the gear set at a speed that is less than a speed of the rotor; and
   a coupler secured to the rotor, formed with a third spline that includes teeth directed along the axis for alternately engaging and disengaging the first spline as the rotor moves along the axis, and formed with a fourth spline that includes teeth directed along the axis for alternately engaging and disengaging the third spline as the rotor moves along the axis.

8. The drive unit of claim 7 wherein the gear unit includes:
   a sun gear driveably connected to the rotor;
   a ring gear held against rotation;
   a carrier driveably connected to the gear set; and
   planet pinion supported for rotation on the carrier and engaged with the sun gear and the ring gear.

9. The drive unit of claim 7 wherein the gear set includes:
   a bevel pinion aligned with the axis; and
   a bevel gear engaged with the bevel pinion and sized such that a speed of the bevel pinion is greater than a speed of the bevel gear.

10. The drive unit of claim 9 further comprising:
    first and second axle shafts, each axle shaft connected to one of the wheels; and
    a differential mechanism driveably connected to the bevel gear for transmitting power between the bevel gear and the axle shafts.

11. The drive unit of claim 7 wherein the coupler alternately couples the rotor and the input mutually and transmits power therebetween, and decouples the rotor and the input mutually.

12. The drive unit of claim 7 wherein the coupler alternately couples the rotor and the gear unit mutually and transmits power therebetween, and decouples the rotor and the gear unit mutually.

* * * * *